(12) United States Patent
Sato (10) Patent No.: US 8,177,208 B2
(45) Date of Patent: May 15, 2012

(54) POSITIONING JIG (75) Inventor: Kazushi Sato, Tokyo (JP)

(73) Assignee: NEC Embedded Products, Ltd., Tokyo (JP)

( * ) Notice: Subject to any disclaimer, the term of this patent is extended or adjusted under 35 U.S.C. 154(b) by 389 days.

(21) Appl. No.: 12/410,691

(22) Filed: Mar. 25, 2009

(65) Prior Publication Data

US 2009/0243178 A1  Oct. 1, 2009

(30) Foreign Application Priority Data

Mar. 27, 2008  (JP) ................................. 2008-084462

(51) Int. Cl.
| | |
|---|---|
| B25B 1/22 | (2006.01) |
| B23Q 3/02 | (2006.01) |
| F16M 11/38 | (2006.01) |
| A45D 19/04 | (2006.01) |
| A47J 47/16 | (2006.01) |
| F16M 11/00 | (2006.01) |
| B23Q 3/00 | (2006.01) |

(52) U.S. Cl. ................ 269/71; 269/72; 269/78; 269/95; 248/166; 248/127

(58) Field of Classification Search ............. 269/71–78, 269/95; 248/166, 127
See application file for complete search history.

(56) References Cited

U.S. PATENT DOCUMENTS

| | | | | |
|---|---|---|---|---|
| 1,495,894 A | * | 5/1924 | Du Bois | 269/76 |
| 1,788,546 A | * | 1/1931 | Schmieder | 269/37 |
| 2,947,214 A | * | 8/1960 | Schwuttke et al. | 356/31 |
| 3,277,939 A | * | 10/1966 | Scott | 144/355 |
| 3,491,995 A | * | 1/1970 | Taraba | 269/8 |
| 4,010,942 A | * | 3/1977 | Ward | 269/15 |
| 4,226,409 A | * | 10/1980 | Hanna | 269/41 |
| 4,461,284 A | * | 7/1984 | Fackler | 600/228 |
| 4,598,574 A | * | 7/1986 | Hegel et al. | 72/481.4 |
| 4,726,577 A | * | 2/1988 | Pontis | 269/71 |
| 4,881,726 A | * | 11/1989 | Jolkovski | 269/41 |
| 5,031,547 A | * | 7/1991 | Hirose | 108/140 |
| 5,092,572 A | * | 3/1992 | Litwak et al. | 5/600 |
| 5,141,211 A | * | 8/1992 | Adams, Jr. | 269/16 |
| 5,342,031 A | * | 8/1994 | Yu-Fang | 269/134 |
| 5,412,174 A | * | 5/1995 | Saeda et al. | 219/121.82 |
| 5,467,972 A | * | 11/1995 | Lee et al. | 269/118 |
| 5,697,601 A | * | 12/1997 | Gurule | 269/43 |
| 6,292,998 B1 | * | 9/2001 | Wiemers | 29/559 |
| 6,606,444 B2 | * | 8/2003 | Harman et al. | 385/137 |

(Continued)

FOREIGN PATENT DOCUMENTS

JP  2001068817 A  3/2001

*Primary Examiner* — Lee D Wilson
*Assistant Examiner* — Alvin Grant (57) ABSTRACT

There is provided a positioning jig capable of reliably adjusting the position The positioning jig includes a shaft including handle attaching portions at one end, a circular support portion at an intermediate portion, the support portion being at right angles to respective threaded holes of the handle attaching portions and including a larger diameter than that of another portion, and an applying portion at the other end; operation handles screwed to the handle attaching portions; and a base member including pins to be fixed to a mounting member, a support hole fitting around the entire periphery of the support portion, and handle fixing portions for regulating movement of the operation handles, wherein the shaft pivots about the support portion as a fulcrum in accordance with screwed amounts of the operation handles to dispose the applying portion at any position in a predetermined plane.

7 Claims, 9 Drawing Sheets

U.S. PATENT DOCUMENTS

| | | | |
|---|---|---|---|
| 6,889,968 B1 * | 5/2005 | Wong | 269/91 |
| 7,093,809 B2 * | 8/2006 | Hwang | 248/166 |
| 7,168,693 B1 * | 1/2007 | Sjuts et al. | 269/37 |
| 7,210,208 B2 * | 5/2007 | Tseng et al. | 29/281.5 |
| 7,232,119 B2 * | 6/2007 | Yonenoi | 269/71 |
| 7,308,747 B2 * | 12/2007 | Smith et al. | 29/434 |
| 2002/0066988 A1 * | 6/2002 | Couture | 269/37 |
| 2002/0152598 A1 * | 10/2002 | Sarh | 29/418 |
| 2006/0125166 A1 * | 6/2006 | Gerritsen et al. | 269/6 |
| 2010/0019427 A1 * | 1/2010 | Nishida | 269/74 |

* cited by examiner

POSITIONING JIG

This application is based upon and claims the benefit of priority from Japanese patent application No. 2008-084462, filed on Mar. 27, 2008, the disclosure of which is incorporated herein in its entirety by reference.

BACKGROUND OF THE PRESENT INVENTION

1. Field of the Present Invention

The present invention relates to a positioning jig for fine adjustment of the attachment position of a temporarily fixed part.

2. Description of Related Art

Japanese Patent Laid Open Publication No. 2001-68817 discloses a multi-degree-of-freedom positioning mechanism as a positioning mechanism for adjusting the position of a positioning target in a three-dimensional space.

In general, at the time of assembling machine parts, full tightening is effected after temporarily fixing the respective parts and strictly positioning the attachment positions thereof.

SUMMARY OF THE PRESENT INVENTION

The positioning mechanism as disclosed in Japanese Patent Laid Open Publication No. 2001-68817 cannot be applied to adjust the position of a part which is buried in a member to which the part is to be attached when temporarily fixed thereto. Thus, it is difficult to perform fine adjustment of the position of the part after temporarily fixing the part.

For example, a magnetic tape running apparatus includes a guide roller for guiding a magnetic tape reeled on from a reel to another reel. If the attachment position of the guide roller is displaced, the guide roller is not mounted perpendicular to the running direction of the tape, and the magnetic tape is not guided in a normal direction. Therefore, it is necessary for a bearing member that supports the guide roller to go through the process of temporary fixing, positioning, and full tightening as described above to be fixed to an apparatus body.

Figure 1:
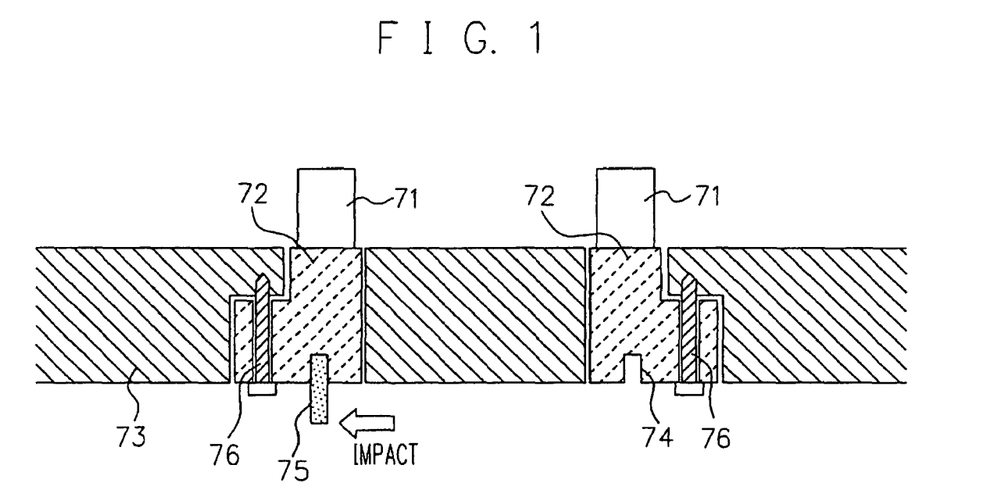
FIG. 1 is a view showing a method for fine adjustment of an attachment position of a bearing that supports a guide roller after temporary fixing.

As shown in FIG. 1, a bearing 72 that supports a guide roller 71 is buried in a body portion 73 when temporarily fixed thereto. Thus, fine adjustment of the position of the bearing 72 is performed by inserting an adjusting member 75 into a concave portion 74 that is formed in a surface on the opposite side from the guide roller 71, and imparting an impact force to the bearing 72 that is temporarily fixed by a fixing screw 76 via the adjusting member 75.

However, with such a method, the attachment position cannot be adjusted by a desired amount in a reliable manner by a single operation (a load of a single impact force). That is, even when the same impact force is loaded, the moving amount of a positioning target member is not always the same. Thus, it is necessary to repeat the fine adjustment and measurement of the position until the attachment position falls within a predetermined tolerance.

Also, the impact force loaded at the time of fine adjustment may affect a precision structure part (a bearing in the case of a bearing member) provided in a member to be attached.

Accordingly, a positioning jig capable of reliably adjusting the position of the positioning target member by a desired amount by a single operation without causing an impact on the positioning target member has been demanded.

The present invention has been made in view of such problems, and it is an object of the present invention to provide a positioning jig capable of reliably adjusting the position of a positioning target member by a desired amount by a single operation without causing an impact on the positioning target member.

In order to achieve the above object, the present invention provides a positioning jig for adjusting an attachment position of a positioning target member within a predetermined plane after temporary fixing, the positioning target member being buried in a member on which the positioning target member is to be mounted when temporarily fixed thereto, including: a shaft including two or more handle attaching portions at one end, the handle attaching portions including threaded holes disposed to intersect each other within a plane parallel to the predetermined plane, a circular support portion at an intermediate portion, the support portion being at right angles to the respective threaded holes of the two or more handle attaching portions and having a larger diameter than a diameter of another portion, and an applying portion for applying a force to the positioning target member at the other end; an operation handle attached to the threaded hole of each of the handle attaching portions by being screwed thereinto; and a base member including an engagement portion for being fixed to the member on which the positioning target member is to be mounted, a support hole defining a substantially circular hole having a size to fit around an entire periphery of the support portion, and a handle fixing portion for regulating movement of the operation handle, wherein the shaft pivots about the support portion as a fulcrum in accordance with respective screwed amounts of the operation handles into the handle attaching portions to dispose the applying portion at any position in the predetermined plane.

BRIEF DESCRIPTION OF THE DRAWINGS

The objects and features of the present invention will become more apparent from the consideration of the following detailed description taken in conjunction with the accompanying drawings, in which.

EXEMPLARY EMBODIMENT

A positioning jig according to a preferred embodiment of the present invention will be described.

Figure 2:
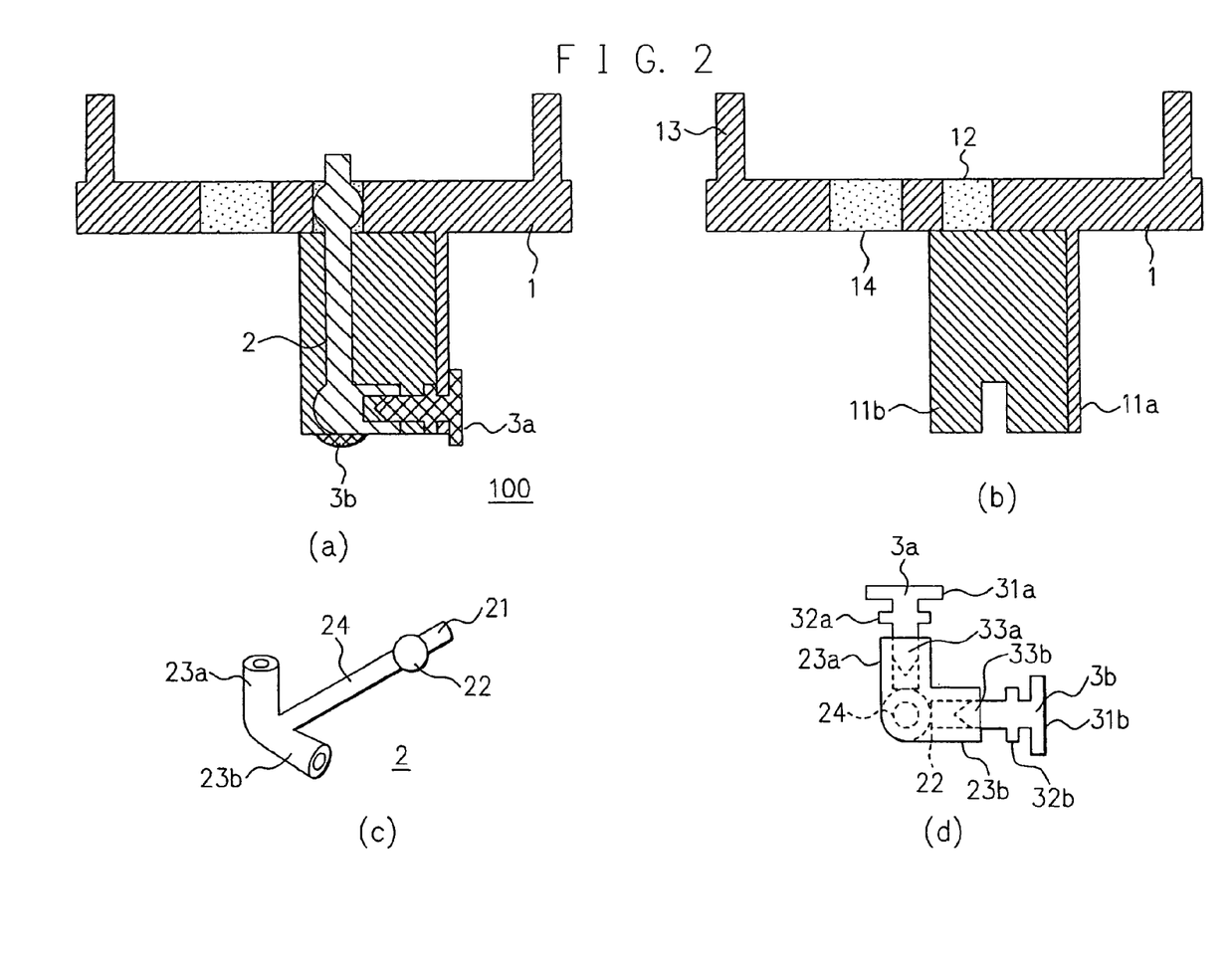
FIG. 2 is a view showing a configuration of a positioning jig according to a preferred embodiment of the present invention.

FIG. 2A shows the configuration of a positioning jig according to the present embodiment. A positioning jig 100 includes a base portion 1, a shaft portion 2, and an operation handle 3 (3a, 3b).

The base portion 1 is a member which supports the shaft portion 2 and fixes the entire positioning jig 100 to a member on which a positioning target member is to be mounted (referred to as mounting member below). The shaft portion 2 is a member which applies a force for position adjustment (referred to as adjusting force below) to the positioning target member. The operation handle 3 is a member which generates the adjusting force in the shaft portion 2.

As shown in FIG. 2B, the base portion 1 includes a handle fixing portion 11 (11a, 11b), a support hole 12, pins 13, and a hole 14. The handle fixing portion 11 is a portion which regulates the operation handle 3 so as not to move in accordance with rotation of a threaded portion 33. The support hole 12 is a portion which supports the shaft portion 2 by abutting a support portion 22 of the shaft portion 2. The pins 13 are portions to be engaged when the positioning jig 100 is fixed to the mounting member. The hole 14 penetrates the base portion 1, and a fixing screw is exposed so as to be fully tightened even in a state in which the positioning jig is fixed to the mounting member.

FIG. 2C shows the configuration of the shaft portion 2. The shaft portion 2 includes an applying portion 21 for applying the adjusting force to the positioning target member, the support portion 22 that is supported by the base portion 1, a handle attaching portion 23 (23a, 23b) in which a threaded hole for attaching the operation handle 3 is formed, and a shaft 24 that couples the support portion 22 and the handle attaching portion 23. As shown in FIG. 2D, the threaded hole of the handle attaching portion 23a, the threaded hole of the handle attaching portion 23b, and the shaft 24 are formed to be at right angles to each other.

As shown in FIG. 2D, the operation handle 3 includes an operation portion 31 (31a, 31b), a fixing portion 32 (32a, 32b), and the threaded portion 33 (33a, 33b). The operation portion 31 is a portion with which a user performs an operation of inserting and removing the threaded portion 33 into and from the operation handle attaching portion 23. The handle fixing portion 11 is disposed between the fixing portion 32 and the operation portion 31 such that the operation handle 3 is not moved in the axial direction of the threaded portion 33 even when the operation portion 31 is operated to rotate the threaded portion 33 in either direction.

Figure 3:
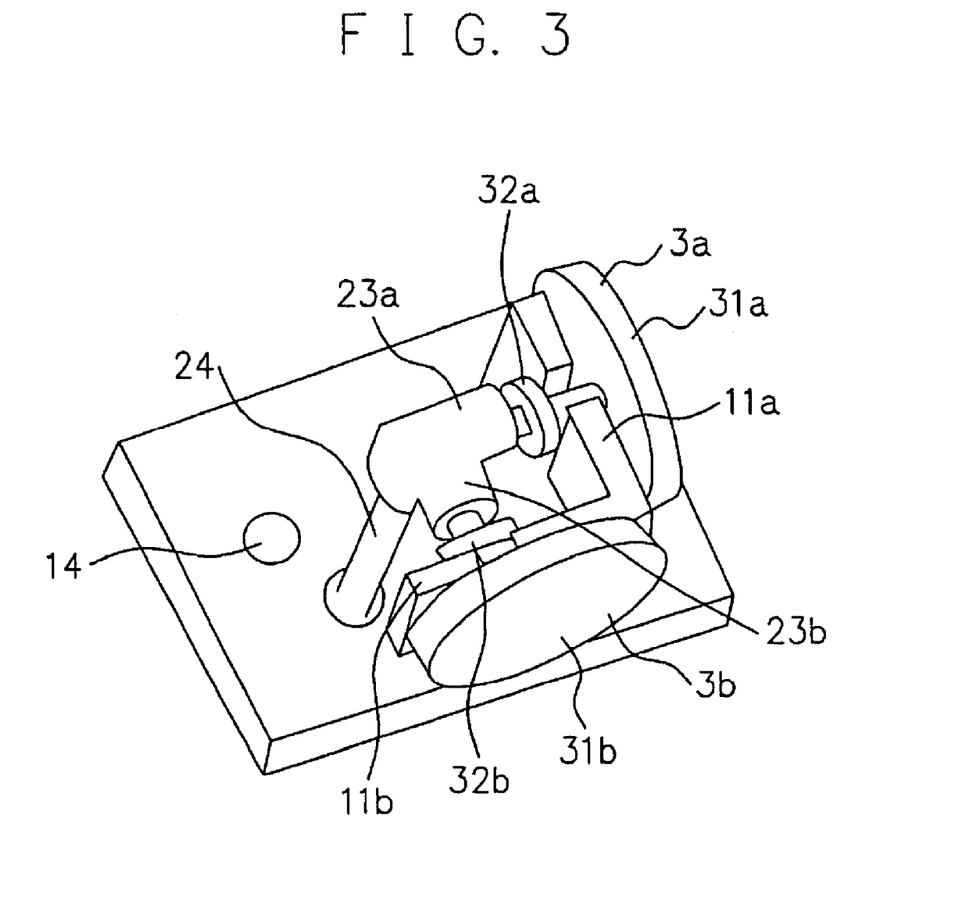
FIG. 3 is a perspective view of a positioning jig.

FIG. 3 is a perspective view of the positioning jig. As shown in FIG. 3, the positioning jig has the same configuration on both the operation handle 3a side and the operation handle 3b side.

The operation of the positioning jig 100 will be described. Since the operation by the operation handle 3a and the operation by the operation handle 3b are the same except for the moving directions of the respective portions, only the operation by the operation handle 3a will be described in the following.

Figure 4:
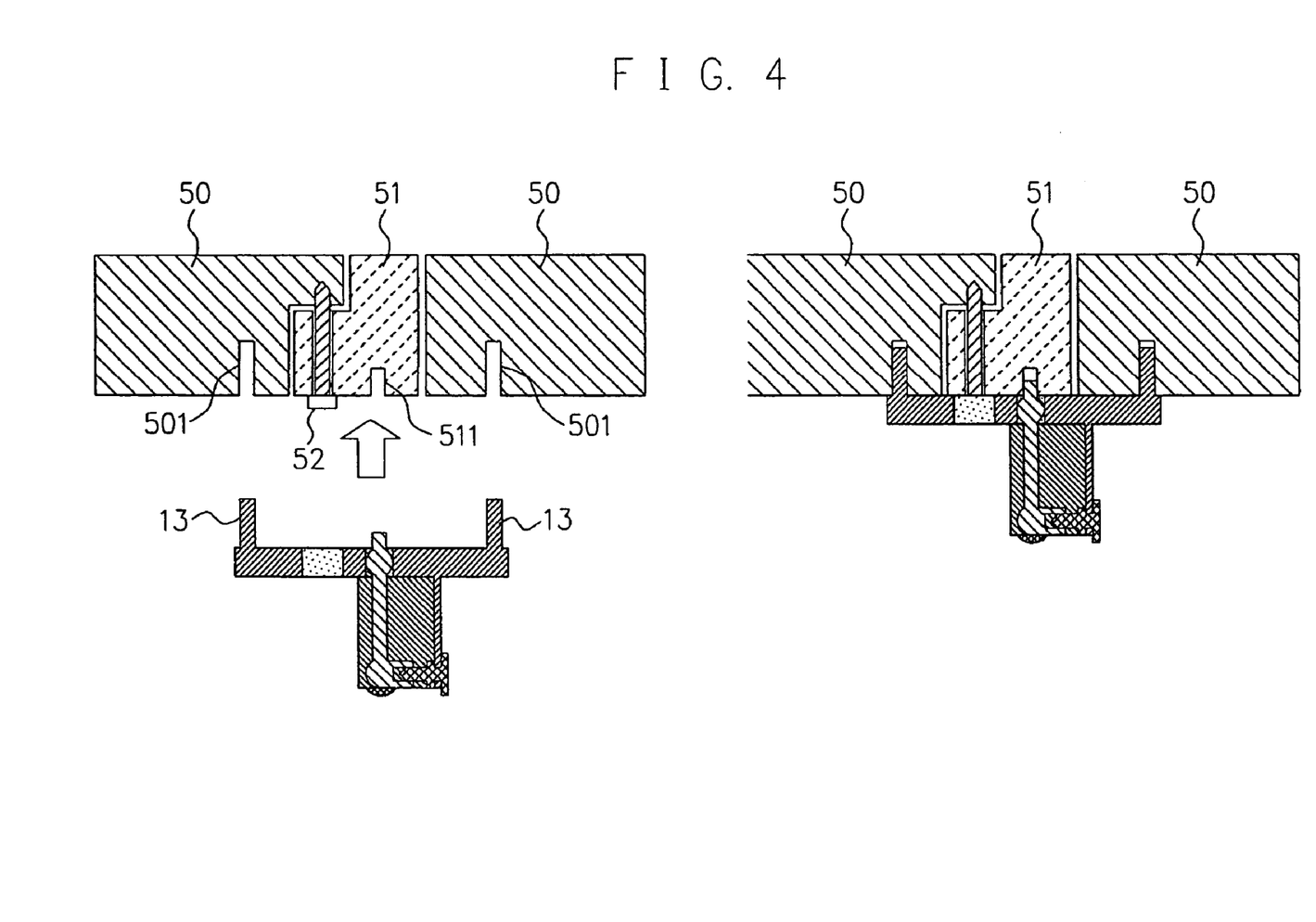
FIG. 4 is a view showing a state in which a positioning jig is fixed to a mounting member.

As shown in FIG. 4, before fine adjustment of the position of a positioning target member 51 that is temporarily fixed by a fixing screw 52, the positioning jig 100 is fixed by inserting the pins 13 into jig attachment holes 501 formed in a mounting member 50, and inserting the applying portion 21 into a concave portion 511 formed in the positioning target member 51.

Figure 5:
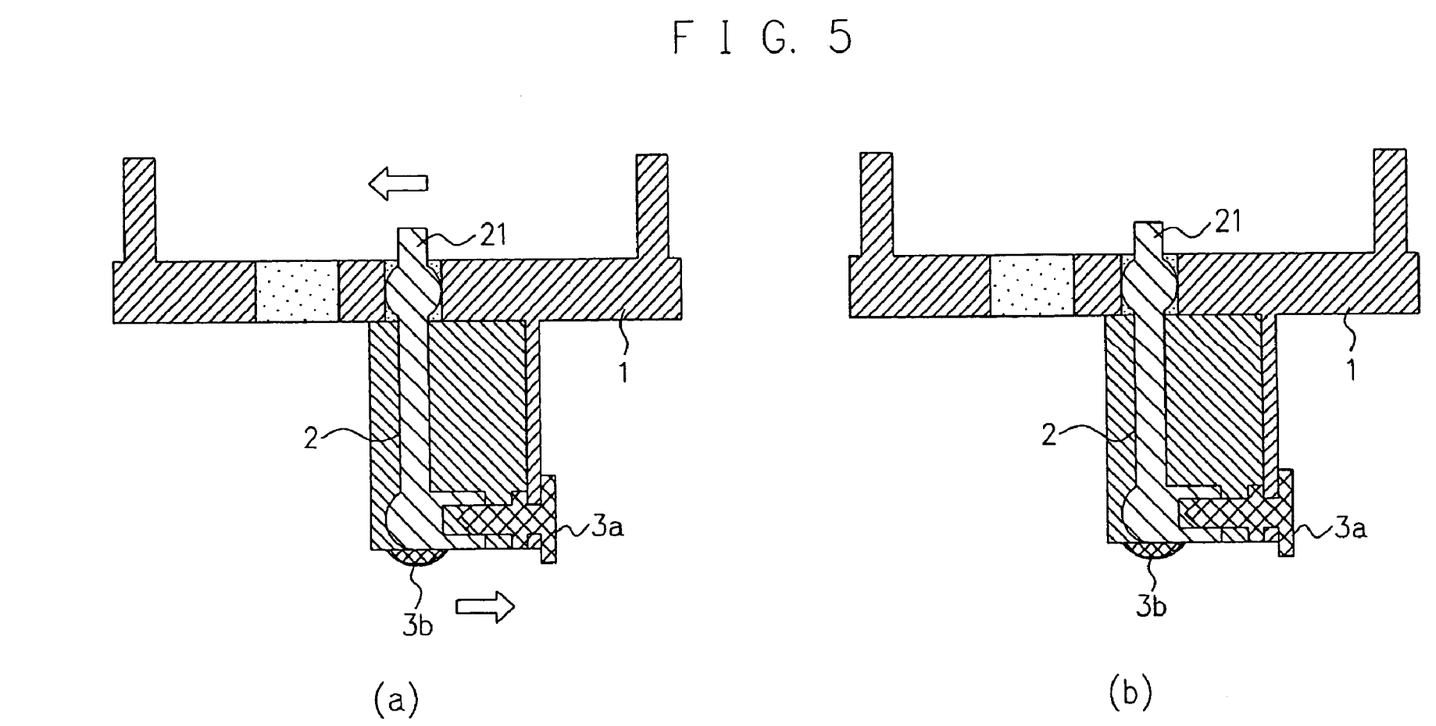
FIG. 5 is a view showing a state in which an applying portion is moved in accordance with operation of an operation handle.

After the positioning jig 100 is fixed to the mounting member 50, the operation handle 3a is operated. As shown in FIG. 5A, when the operation portion 31a is operated in a direction in which the threaded portion 33a is screwed into the handle attaching portion 23, the handle attaching portion 23a is pulled toward the operation handle 3a since the movement of the operation handle 3a is regulated by the handle fixing portion 11a. The shaft portion 2 thereby rotates about the support portion 22 as a fulcrum, so that the applying portion 21 is moved to the left as shown in FIG. 5B.

Figure 6:
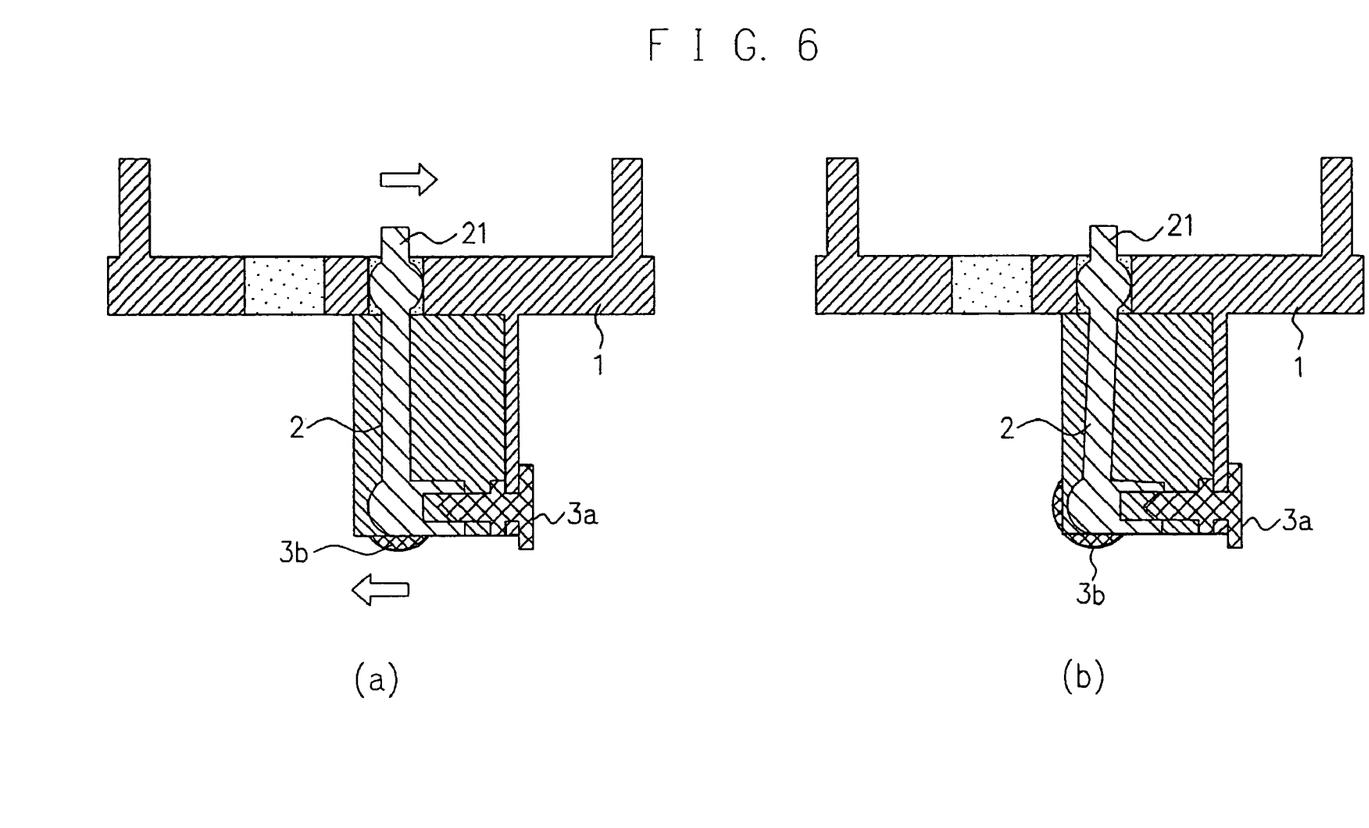
FIG. 6 is a view showing a state in which an applying portion is moved in accordance with operation of an operation handle.

On the other hand, as shown in FIG. 6A, when the operation portion 31a is operated in a direction in which the threaded portion 33a is pulled out of the handle attaching portion 23, the handle attaching portion 23a is moved away from the operation handle 3a since the movement of the operation handle 3a is regulated by the handle fixing portion 11a. The shaft portion 2 thereby rotates about the support portion 22 as a fulcrum, so that the applying portion 21 is moved to the right as shown in FIG. 6B.

Since the applying portion 21 is moved in an arc at the time of the above operation, a tip of the applying portion 21 moves not only in a direction perpendicular to the shaft 24, but also in the axial direction of the shaft 24 to be exact. However, the moving amount in the axial direction of the shaft 24 is small enough to be disregarded in comparison with the moving amount in the direction perpendicular to the shaft 24, and thus, the tip of the applying portion 21 can be considered to move linearly.

Figure 7:
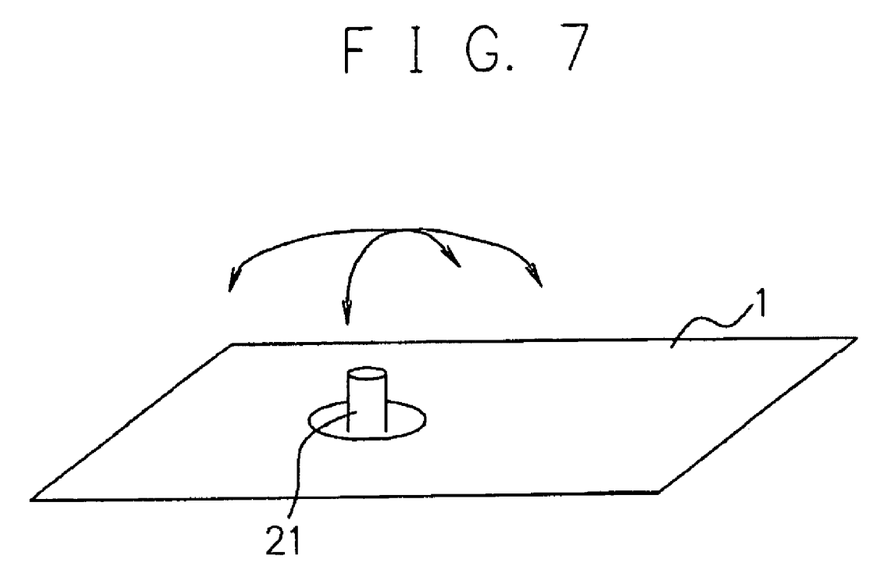
FIG. 7 is a view showing a state in which a tip of an applying portion is moved in any direction in a plane perpendicular to a shaft.

Therefore, by combining the operation of each of the operation handles 3a and 3b, the tip of the applying portion 21 can be moved in any direction in a plane perpendicular to the shaft 24 as shown in FIG. 7. Since the moving amount of the tip of the applying portion 21 is almost proportional to the operational amounts of the operation handles 3a and 3b, the tip of the applying portion 21 can be moved by a desired amount by a single operation.

Also, the adjusting force generated at this point in time is generated by the principle of leverage with the handle attaching portion 23 as an effort, the support portion 22 as a fulcrum, and the applying portion 21 as a load. Therefore, a force large enough to move the temporarily fixed positioning target member 51 can be generated as a non-impact load.

After positioning the positioning target member 51 by operating the operation handles 3a and 3b, the fixing screw 52 is fully tightened through the hole 14, to completely fix the positioning target member 51 to the mounting member 50.

Thereafter, the positioning jig 100 is removed by pulling the pins 13 out of the jig attachment holes 501, so that the positioning of the positioning target member is completed.

As described above, the positioning jig 100 according to the present embodiment can reliably adjust the position of the positioning target member 51 by a desired amount by a single operation without causing an impact on the positioning target member 51. Therefore, a positioning operation can be effectively performed without harmful effects on a precision part or the like included in the positioning target member 51.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Figure 8:
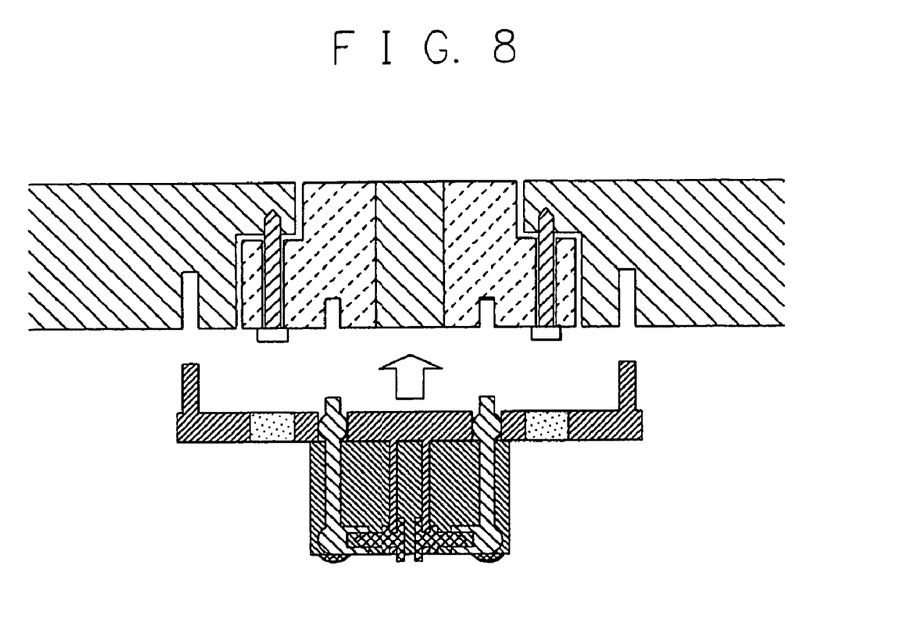
FIG. 8 is a view showing a configuration of a positioning jig for performing fine adjustment of attachment positions of a plurality of positioning target members.

For example, although the case in which there is a single positioning target member is described in the aforementioned embodiment, the present invention may be also applied to a case of effecting positioning of a plurality of positioning target members with respect to a mounting member. In such a case, the shaft portions 2 of the same number as that of the positioning target members may be supported by the base portion 1 and the same configuration as described above may be provided such that the shaft portions 2 corresponds to the positioning target members respectively as shown in FIG. 8.

Figure 9:
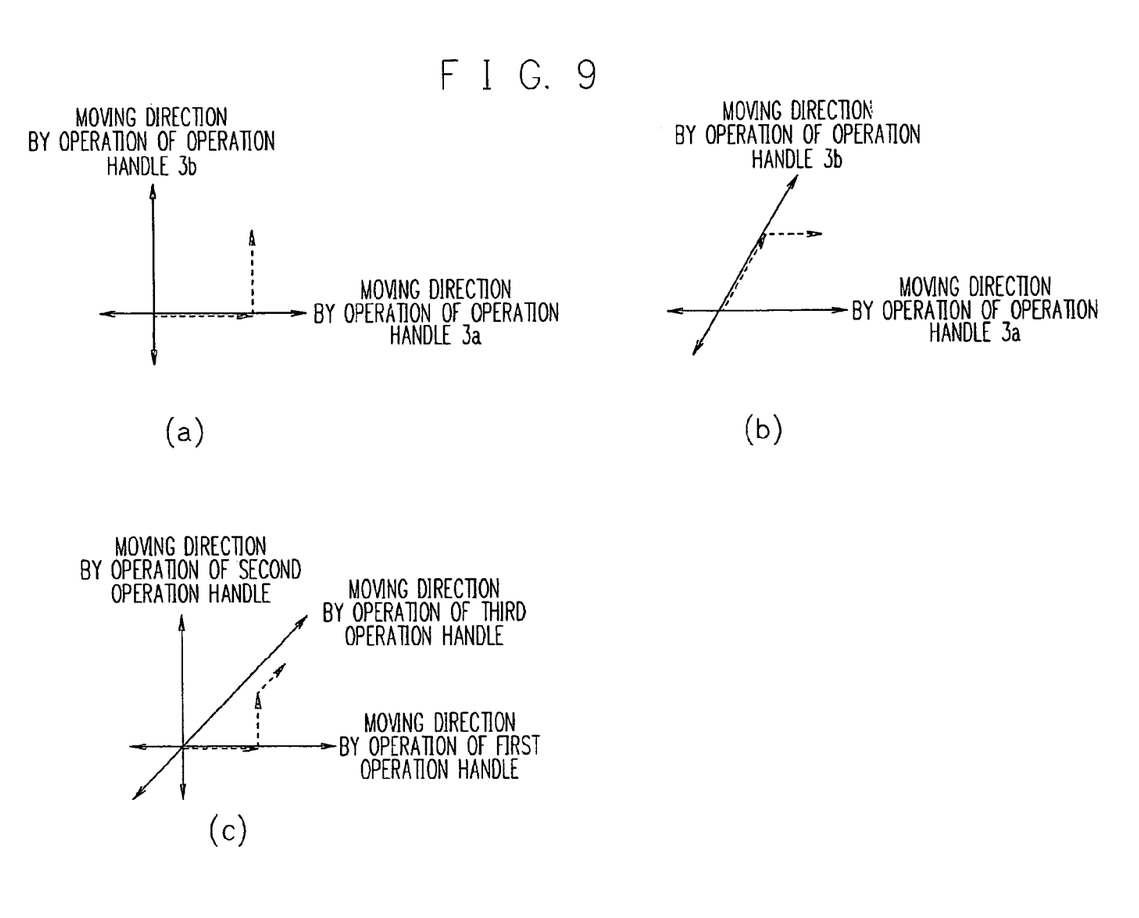
FIG. 9 is a view showing a relationship between operation of an operation handle and a moving direction of an applying portion.

Also, although the case in which the threaded portions 33a and 33b are at right angles to each other is described in the aforementioned embodiment, the threaded portions 33a and 33b may not be necessarily at right angles to each other. That is, as shown in FIG. 9A, the movement of the applying portion 21 may be achieved by combining a motion vector by the operation of the operation handle 3a and a motion vector by the operation of the operation handle 3b. Thus, even when the moving direction by the operation of the operation handle 3a and the moving direction by the operation of the operation handle 3b are not at right angles to each other, the applying portion 21 can be moved to any position as shown in FIG. 9B. That is, the applying portion 21 can be moved to any position so long as the moving direction by the operation of the operation handle 3a and the moving direction by the operation of the operation handle 3b are not parallel to each other.

Furthermore, as shown in FIG. 9C, three or more operation handles may be also provided.

As described above, various modifications may be made in the present invention.

What is claimed is:

1. A positioning jig for adjusting an attachment position of a positioning target member within a predetermined plane after temporary fixing, comprising:
    a shaft including
        two or more handle attaching portions at one end, the handle attaching portions including threaded holes disposed to intersect each other within a plane parallel to the predetermined plane,
        a circular support portion at an intermediate portion, the support portion being at right angles to the respective threaded holes of the two or more handle attaching portions and having a larger diameter than a diameter of another portion of the shaft, and
        an applying portion for applying a force to the positioning target member at an other end of the shaft;
    an operation handle attached to the threaded hole of each of the handle attaching portions by being screwed thereinto; and
    a base member including an engagement portion for being fixed to a member on which the positioning target member is to be mounted, a support hole defining a substantially circular hole having a size to fit around an entire periphery of the support portion, and a handle fixing portion for regulating movement of the operation handle,
    wherein the shaft pivots about the support portion as a fulcrum in accordance with respective screwed amounts of the operation handles into the handle attaching portions to dispose the applying portion at any position in the predetermined plane.

2. The positioning jig according to claim 1, wherein the positioning target member is a member that is buried in the member on which the positioning target member is to be mounted when temporarily fixed thereto.

3. The positioning jig according to claim 1, wherein the number of the handle attaching portions is two.

4. The positioning jig according to claim 3, wherein the threaded holes of the two handle attaching portions are at right angles to each other.

5. The positioning jig according to claim 1, wherein the support portion is provided on the applying portion side from the center of the shaft.

6. The positioning jig according to claim 1, wherein the support portion is substantially spherical.

7. The positioning jig according to claim 1, wherein
    the two or more shafts are supported by the base member,
    the operation handles are respectively attached to the threaded holes of the handle attaching portions of each of the shafts,
    the base member supports the support portion of each of the shafts and regulates movement of each of the operation handles, and
    the applying portion of each of the shafts can be disposed at any position in the predetermined plane.

* * * * *